(No Model.)

H. HINCKLEY.
CAR BRAKE.

No. 488,314.   Patented Dec. 20, 1892.

Witnesses
Edw. A. Muir

Inventor
Howard Hinckley.
By his Attorney

UNITED STATES PATENT OFFICE.

HOWARD HINCKLEY, OF TRENTON, NEW JERSEY.

CAR-BRAKE.

SPECIFICATION forming part of Letters Patent No. 488,314, dated December 20, 1892.

Application filed August 22, 1890. Renewed November 12, 1892. Serial No. 451,793. (No model.)

*To all whom it may concern:*

Be it known that I, HOWARD HINCKLEY, a citizen of the United States, residing at Trenton, in the county of Mercer and State of New Jersey, have invented certain new and useful Improvements in Car-Brakes; and I do hereby declare the following to be a full, clear, and exact description of the invention, such as will enable others skilled in the art to which it appertains to make and use the same.

The invention relates especially to automatic power-actuated brakes, and has for its object to provide certain new and improved means whereby the slack, caused by the wearing away of the brake shoes against the wheels, will be automatically taken up, thus doing away with the necessity for frequent inspection of the lever system, and readjustment of the parts by hand. In any of the automatic power-actuated brakes, it is necessary to so arrange and adjust the parts of the lever system that the stroke of the primary brake lever required to fully set the brakes shall not exceed its effective range.

In equipping new cars with any of the automatic power-actuated brakes now in use, it is necessary to arrange and adjust the parts of the system of levers between the piston (or whatever other primary brake actuating mechanism is employed) and the brake shoes so that the stroke of the primary lever required to set the brake shall not exceed its effective range. The subsequent use of the brakes and the wearing away of the shoes necessitates an increased stroke of this primary lever, and, unless some compensation is made for this wear, the movement of the lever increases until it gets beyond the limit of its effective range, thereby impairing the efficiency of the brakes; or this increased movement of the lever may even extend to the actual limit of its movement, thereby rendering the brake entirely inoperative. Attempts have heretofore been made to take up this slack automatically, but, so far as I am aware, none of the systems have proved efficient, and the old method of personal inspection and hand adjustment is still the only one in use. This method consists in shifting the fulcrum of what is called the "dead-lever" of the lever system along the "dead-lever guide" by hand, the guide being provided with a line of perforations into any one of which the fulcrum pin of the lever may be adjusted. It will be seen that this necessitates frequent and careful inspections of the lever system, and, when adjustment is found to be necessary, it requires considerable time and labor to perform it.

Figure 1:
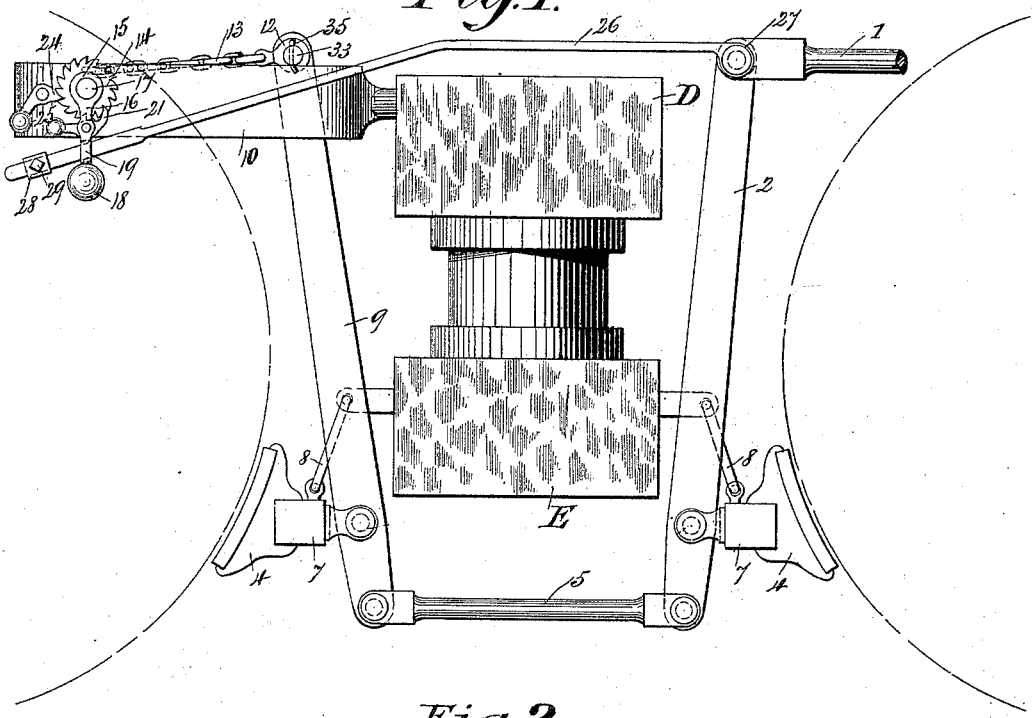
Figure 2:
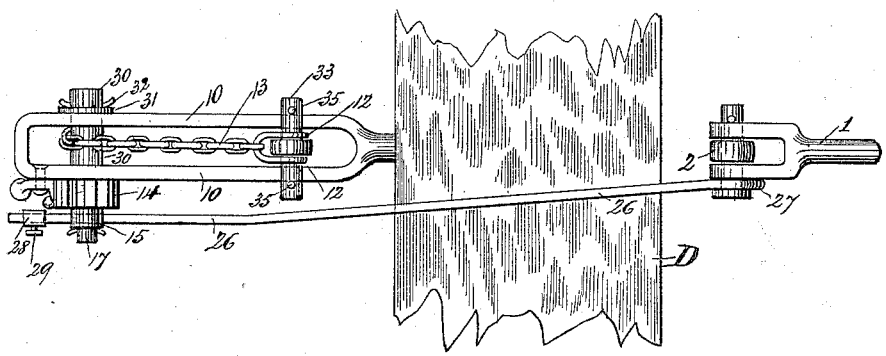
Figure 3:
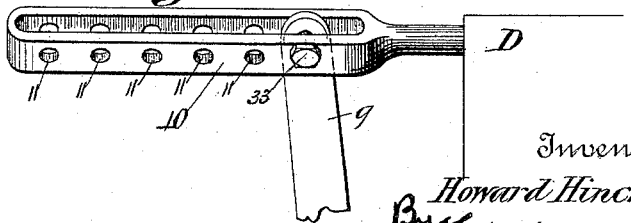

In carrying out my invention I preserve the same organization and arrangement of the lever system now commonly employed, retaining the same dead-lever and dead-lever guide; and the invention consists in an attachment by means of which the adjustment of the fulcrum of the lever along the guide is automatically performed as the wearing away of the shoes necessitates an increased throw of the primary lever. I will now describe one form of this attachment, reference being had to the accompanying drawings, in which Figure 1 is an end view of the spring-plank and bolster of a truck with my invention applied thereto. Fig. 2 is a plan view of the same. Fig. 3 is a perspective detail showing the old way of adjusting the fulcrum of the dead lever.

In the drawings E denotes the spring-plank, D the truck bolster, 2 the so called "live lever" of the brake system, and 1 the rod or link by which this lever is operated indirectly from the piston, diaphragm, or other primary brake operating mechanism. The dead-lever is denoted by 9, and 10 indicates its guide the latter being fixed to the truck bolster. 7 are the brake beams and 4 are the shoes, the beams being hung from the spring plank E by the links 8. The live lever 2 and the dead-lever 9 are connected together by the rod 5. These parts and their arrangement and connections are common to the well known Westinghouse automatic air-brake system, and need no further description or explanation.

Instead of mounting the dead-lever upon its guide 10 in the old way, and adjusting its fulcrum in the manner represented in Fig. 3, I pivot it upon a fulcrum movable lengthwise of the guide. A simple and effective means for this purpose is as follows:—The fulcrum pin 33 is made longer than usual, and the end of the lever is passed up through the guide as shown, so that it may be supported thereon by the pin spanning and resting upon the top of the guide, the pin and lever being thus free to move to and fro on the guide.

30 denotes a windlass shaft mounted in the guide near its outer end. Keyed or otherwire fixed on one end of this shaft is a broad faced ratchet wheel 14, which when the shaft is in place abuts against one side of the guide, the other end of the shaft preferably having a washer 31 and pin or cotter 32 by which means the shaft is prevented from endwise movement in its bearings. Pivoted to the guide in suitable relation to the ratchet wheel 14 is a weighted or spring pawl 24 adapted by engaging the teeth of the ratchet to lock and hold the shaft against backward rotation. Outside of the ratchet wheel 14, upon the end of the shaft, which is conveniently reduced for this purpose, as shown at 17, there is loosely hung the weighted or spring actuated pawl-carrying arm 16, the arm having an eye 15 at its upper end and a weight 18 on its opposite end. About midway of its length the arm carries the weighted or spring pawl 17 arranged to engage with the ratchet wheel and turn the shaft as the lever is swung in one direction and to slip over the teeth of the wheel as it goes in the opposite direction. 13 indicates a stout chain, wire rope or other flexible connection, connected at one end to the shaft, so as to be wound thereon as the shaft rotates, and at its opposite end by means of a yoke-eye 12 to the fulcrum pin 33 of the dead-lever 9.

Connected to the upper end of the live lever 2, or to the link 1, is a long rod 26 extending back over the top of the bolster, and passing through a slot 19 in the pawl-carrying arm 16, the rear part of the rod being preferably flattened for that purpose. On the outer end of the rod 26, beyond the arm 16, is fixed a stop or block 28 made adjustable along the rod by means of a set screw 29 or other suitable device.

The construction being as above described the operation is as follows: The movement of the rod 1 having been fixed, the stop 28 on the rod 26 is so adjusted as just to touch the pawl-carrying arm 16 when the lever 2 is at the limit of its forward movement. Repeated applications of the brakes having worn the shoes away, the movement of the lever 2 increases and the stop 28 strikes the arm 16 and swings it slightly forward with each application. As the movement of the lever 2 continues to increase the distance through which the arm 16 is swung also increases until it becomes sufficient to cause the pawl 21 to gain a tooth of the ratchet wheel when the shaft will be slightly turned and the rope or chain 13 will be wound thereon. The locking pawl 24 prevents the unwinding of the chain. This taking up or shortening of the chain shifts the fulcrum of the dead-lever 9 and thereby immediately restores the movements of the levers to their original setting. This operation is repeated as often as the wearing away of the shoes causes sufficient enlargement of the movement of the primary lever 2 to carry the pawl 21 up one tooth on the ratchet, thus automatically correcting this excess of movement of the live lever and restoring it to its proper travel by adjusting or resetting the fulcrum of the dead-lever. It will be noted that the turning of the shaft and winding up of the chain are very slow and gradual, being dependent upon and co-extensive with the wearing of the brake shoes.

I wish to be understood as not intending to be limited to the details of the mechanism herein shown and described, for the invention is obviously capable of embodiment in many different forms and arrangements thereof. It is obvious that the rod 26 may connect with the link 1, also that the shaft 30 may be mounted on any other part of the truck, also that the chain 13 may connect with the body of the lever instead of with the fulcrum pin and that the pawls and pawl carrying arm may be actuated by a spring.

The invention may be applied with very little expense or alteration to cars having the old form of dead-lever guide, and forms an efficient automatic slack take up, requiring no attention after being set up, and operating under conditions where more complicated ones would fail.

Having thus described my invention, what I claim is:—

1. In a slack take-up for railway brakes, the combination, substantially as hereinbefore set forth, of the dead lever, a windlass shaft, and a flexible connection between the shaft and the lever, whereby the fulcrum of the lever may be shifted.

2. In a slack take-up for railway brakes, the combination, substantially as hereinbefore set forth, of the dead lever, a windlass shaft, a flexible connection between the shaft and lever, means for turning the shaft to shorten the connection and shift the fulcrum of the lever, and means to lock the shaft against backward movement.

3. In a slack take-up for railway brakes, the combination, substantially as hereinbefore set forth, of the dead lever, a windlass shaft, a flexible connection between the shaft and lever, and means for turning the shaft to shift the fulcrum of the lever while the brakes are being applied.

4. In a slack take-up for railway brakes, the combination, substantially as hereinbefore set forth, of the dead lever, a windlass shaft, a flexible connection between the shaft and the lever, and positively acting mechanism for turning the shaft to shift the fulcrum of the lever while the brakes are being applied.

5. In a slack take-up for railway brakes, the combination, substantially as hereinbefore set forth, of the dead lever guide, the lever guided thereby and having a movable fulcrum, and mechanism to automatically shift the fulcrum while the brakes are being applied.

6. In a slack take-up for railway brakes, the combination, substantially as hereinbefore set forth, of the live lever, the dead lever link-connected therewith at one end, the dead lever guide, a fulcrum for the dead lever movable lengthwise of the guide, mechanism for shifting the fulcrum, and positively acting mechanism connected with the opposite end of the live lever for actuating the fulcrum shifting mechanism when the lever is operated to apply the brakes.

7. In a slack take-up for railway brakes, the combination, substantially as hereinbefore set forth, of the live lever, the dead lever link-connected thereto at one end, the dead lever guide, a movable fulcrum for the dead lever, a windlass shaft, a flexible connection between the shaft and the dead lever, a pawl carrying arm for turning the shaft, and a connection from said arm to the live lever, whereby the forward movement of the latter turns the shaft.

8. In a slack take-up for railway brakes, the combination, substantially as hereinbefore set forth, of the live lever, the dead lever link-connected thereto at one end, the dead lever guide, a movable fulcrum for the lever, a windlass shaft, a flexible connection between the shaft and the dead lever, a fixed ratchet on the shaft, a locking dog for the ratchet, a pivoted arm carrying an operating pawl engaging the ratchet, and a loose-link connection between the arm and the live lever.

9. In a slack take-up for railway brakes, the combination, substantially as hereinbefore set forth, of the live lever, the dead lever link-connected thereto at one end, the dead lever guide, a movable fulcrum for the lever, a windlass shaft, a flexible connection between the shaft and the dead lever, a ratchet fixed on the shaft, a locking dog for the ratchet, a pivoted arm carrying an operating pawl engaging the ratchet, a link connected at one end with the live lever and having a loose connection with the pawl carrying arm, and an adjustable stop on the link.

In testimony whereof I affix my signature in presence of two witnesses.

HOWARD HINCKLEY.

Witnesses:
S. B. HUTCHINSON,
L. SCHOONOVER.